US012530281B2

(12) United States Patent
Macxis et al.

(10) Patent No.: US 12,530,281 B2
(45) Date of Patent: Jan. 20, 2026

(54) ROBOTICALLY TESTING ACCESSIBILITY (71) Applicant: Bank of America Corporation, Charlotte, NC (US)

(72) Inventors: Mardochee Macxis, Concord, NC (US); Yogi Ahuja, Warwick, PA (US); Ion C. Freeman, Manchester Center, VT (US); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 261 days.

(21) Appl. No.: 18/096,654

(22) Filed: Jan. 13, 2023

(65) Prior Publication Data

US 2024/0241819 A1 Jul. 18, 2024

(51) Int. Cl.
*G06F 9/45* (2006.01)
*G06F 9/44* (2018.01)
*G06F 9/445* (2018.01)
*G06F 9/455* (2018.01)
*G06F 11/3668* (2025.01)

(52) U.S. Cl.
CPC ........ *G06F 11/3688* (2013.01); *G06F 11/368* (2013.01); *G06F 11/3696* (2013.01)

(58) Field of Classification Search
CPC ............ G06F 11/3664; G06F 11/3688; G06F 11/368; G06F 11/3692; G06F 11/3696
See application file for complete search history.

(56) References Cited

U.S. PATENT DOCUMENTS

| 2021/0263830 | A1* | 8/2021 | Kruglov | G06F 21/577 |
| 2022/0121723 | A1* | 4/2022 | Page | G06F 11/0784 |
| 2022/0188181 | A1* | 6/2022 | Saha | G06F 11/0793 |
| 2022/0237483 | A1* | 7/2022 | Mossler | G06N 5/04 |
| 2022/0358027 | A1* | 11/2022 | Poynter | G06F 3/011 |
| 2023/0063753 | A1* | 3/2023 | Karri | G06F 11/3688 |

(Continued)

FOREIGN PATENT DOCUMENTS

| CN | 113268044 A * | 8/2021 | ....... G05B 19/41885 |
| WO | WO-2022226259 A2 * | 10/2022 | .......... G06F 11/3684 |

OTHER PUBLICATIONS

Martez Mott, Accessible by Design: An Opportunity for Virtual Reality, 2019, pp. 1-4. https://ieeexplore.ieee.org/stamp/stamp.jsp?tp=&arnumber=8951960 (Year: 2019).*

(Continued)

*Primary Examiner* — Mongbao Nguyen
(74) *Attorney, Agent, or Firm* — Weiss & Arons LLP (57) ABSTRACT

Apparatus and methods for automatically testing accessibility of programs and hardware are provided. A program may receive configuration settings, a test program, and a set of accessibility rules. The program may automatically create a virtual test environment according to the configuration settings. The program may automatically run the test program within the virtual test environment and analyze the test program against the accessibility rules. When the test program fails to meet one or more of the accessibility rules, the program may determine, create, and test potential fixes until the revised test program meets all of the accessibility rules. The program may generate and transmit a report describing the results of any test.

18 Claims, 6 Drawing Sheets

(56) References Cited

U.S. PATENT DOCUMENTS

| | | | |
|---|---|---|---|
| 2023/0098596 A1* | 3/2023 | Karri | G06N 3/094 |
| | | | 717/125 |
| 2023/0362187 A1* | 11/2023 | Walch | H04L 63/1433 |
| 2024/0037019 A1* | 2/2024 | Aird | G06F 11/3696 |
| 2024/0104004 A1* | 3/2024 | S. | G06F 11/3688 |
| 2024/0211376 A1* | 6/2024 | Wolf | G06F 8/38 |
| 2025/0028620 A1* | 1/2025 | Sarangi | G06F 11/22 |

OTHER PUBLICATIONS

Ana Iglesias, Extending the Evaluation of Social Assistive Robots With Accessibility Indicators: The AUSUS, 2021, pp. 601-611. https://ieeexplore.ieee.org/stamp/stamp.jsp?tp=&arnumber=9576895 (Year: 2021).*

Macgregor et al. (CN 113268044 A), 2021, pp. 1-29. (Year: 2021).*

Jeronimo G Grandi, Design and Simulation of Next-Generation Augmented Reality User Interfaces in Virtual Reality, 2021, pp. 1-7. https://ieeexplore.ieee.org/stamp/stamp.jsp?tp=&arnumber=9419218 (Year: 2021).*

Concha Batanero, Effects of New Supportive Technologies for Blind and Deaf Engineering Students in Online Learning, 2019, pp. 270-275. https://ieeexplore.ieee.org/stamp/stamp.jsp?tp=&arnumber=8660410 (Year: 2019).*

Malak Qbilat, A Proposal of Accessibility Guidelines for Human-Robot Interaction, 2021, pp. 1-13. https://www.mdpi.com/2079-9292/10/5/561 (Year: 2021).*

* cited by examiner

ROBOTICALLY TESTING ACCESSIBILITY

FIELD OF TECHNOLOGY

Aspects of the disclosure relate to providing apparatus and methods to automatically test software and hardware for disability accessibility.

BACKGROUND OF THE DISCLOSURE

As currently interpreted, the Americans with Disability Act ("ADA") (42 U.S.C. § 12101 et seq.), as well as company policies and other rules and regulations, may mandate that some software and hardware be accessible to various disabilities, such as blindness, deafness, and lack of motor control. Font sizes, volumes, input controls and options, and other aspects of software and hardware may be adjusted to comply with the ADA.

Website designers, program developers, product designers, and other designers/engineers may be required to make their products accessible in various ways. However, manually testing every configuration of every product for each relevant accessibility option may be time and cost prohibitive.

These time and cost pressures may be exacerbated by the current proliferation of mobile devices and operating systems. For example, a program may be ADA-compliant and accessible on one smartphone model, but on a different model with a different sized screen, the program may not be ADA-compliant.

Currently, there is no apparatus or method available to automatically test various software and hardware for ADA accessibility.

Therefore, it would be desirable for apparatus and methods to automatically test software and hardware for ADA-compliance and disability accessibility.

SUMMARY OF THE DISCLOSURE

It is an object of this disclosure to provide apparatus and methods to automatically test software and hardware for ADA-compliance and disability accessibility.

An automatic accessibility testing computer program product is provided. The computer program product may include executable instructions stored on non-transitory memory. The executable instructions may be executed by a processor on a computer system.

The instructions may receive, inter alia, configuration specifications, a set of two or more accessibility rules, and a test program with an unknown match to the accessibility rules.

The configuration specifications may include operating system, screen size and dimensions, screen pixel amount, speaker, available input information, as well as any other data necessary to test the test program.

The set of accessibility rules may include various rules necessary to be accessible and ADA-compliant, such as visible font size, a screen magnifier, various input options, volume control, text-to-speech options, as well as other rules.

The instructions may create a virtual test environment according to the configuration specifications. The virtual test environment may be a virtual twin to a specific piece of hardware or software (such as, e.g., a particular smartphone model, a particular ATM model, or a particular browser).

The instructions may run the test program with the unknown match in the virtual test environment. The instructions may analyze the running test program against the accessibility rules to determine whether the test program meets the accessibility rules and is ADA-compliant or not.

The instructions may determine when the test program fails to meet one or more of the accessibility rules or meets any particular accessibility rule.

When the instructions determine that the test program fails to meet two or more of the accessibility rules, the instructions may prioritize each failure in order of importance. For example, a failure to meet one rule may be more important to fix than a failure to meet a different rule.

The instructions may generate a report including the results of the analysis and determinations. The instructions may transmit the report to a system administrator or other user.

In an embodiment, when the computer program product determines that the test program fails to meet one or more of the accessibility rules, the instructions may determine a potential fix, create code to implement the potential fix, implement the code into the test program to create a revised test program, and test the revised test program within the virtual test environment. When the revised test program meets the accessibility rules, the instructions may attach a copy of the revised test program to the report.

In an embodiment, the instructions may iterate and test additional potential fixes for a pre-determined amount of time or until a fix is created.

In an embodiment, the automatic accessibility testing computer program product instructions may use one or more artificial intelligence/machine learning ("AI/ML") algorithms to perform its various functions. For example, the program may use an AI/ML algorithm to analyze the test program, determine whether the test program meets or fails to meet any particular accessibility rule, determine a potential fix, create the code to implement the potential fix, implement the code into the test program to create the revised test program, or other functions.

In an embodiment, the configuration specifications may be for physical hardware, such as an ATM or particular smartphone model.

In an embodiment, the configuration specifications may be for software, such as, e.g., a web browser, bespoke screen display program, or operating system.

In an embodiment, when the test program meets all of the two or more accessibility rules, the instructions may approve the test program and report that approval to system administrator or other user.

In an embodiment, the report may be transmitted to a system administrator.

In an embodiment, the instructions may prioritize each failure through an analysis by one or more artificial intelligence/machine learning ("AI/ML") algorithms.

In an embodiment, the virtual test environment may be a simulated augmented reality/virtual reality environment.

In an embodiment, the virtual test environment may include a simulated user with one or more disabilities.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

It is an object of this disclosure to provide apparatus and methods to automatically test and refine hardware as well as software for ADA-compliance and disability accessibility.

An automatic accessibility testing computer program product is provided. The computer program product may include executable instructions stored on non-transitory memory. The executable instructions may be executed by a processor on a computer system.

Multiple processors may increase the speed and capability of the program. The executable instructions may be stored in non-transitory memory on the computer system or a remote computer system, such as a server.

Other standard components of a computer system may be present. The computer system may be a server, mobile device, or other type of computer system. A server or more powerful computer may increase the speed at which the computer program may run. Portable computing devices, such as a smartphone, may increase the portability and usability of the computer program, but may not be as secure or as powerful as a server or desktop computer.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

The computer may include a communication link, a processor or processors, and a non-transitory memory configured to store executable data configured to run on the processor, among other components. The executable data may include an operating system and the automatic accessibility testing computer program.

A processor (s) may control the operation of the computer system and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with other computers as well as any server or servers. The communication link may include any necessary hardware (e.g., antennae) and software to control the link. Any appropriate communication link may be used. In an embodiment, the network used may be the Internet. In another embodiment, the network may be an internal intranet or other network.

The computer system may be a server. The computer program may be run on a smart mobile device. The computer program, or portions of the computer program may be linked to other computers or servers running the computer program. The server or servers may be centralized or distributed. Centralized servers may be more powerful and secure than distributed servers but may also be more expensive.

The instructions may receive, inter alia, configuration specifications, a set of two or more accessibility rules, and a test program with an unknown match to the accessibility rules. These may be received from a user, such as a system administrator, another program, another computer, or elsewhere.

In an embodiment, the program may request configuration specifications, a set of two or more accessibility rules, or a test program from a user, another computer, a network location, or elsewhere.

The configuration specifications may include any data necessary to test the test program, such as, e.g., an operating system, screen size and dimensions for a particular user device, screen pixel amount, speaker, available input information, and other information. The configuration specifications can be in any format.

The configuration specifications may be sufficient for the computer program to recreate, virtually, a particular user device or software and how that user device or software may act when the test program is run on the user device. Configuration specifications may simply be data files. Configuration specifications may be in any appropriate format.

Each configuration specification may be provided by a user, another program, another computer, or elsewhere. Each configuration specification may include information on a particular device or software, sufficient for the instructions to recreate the device or software within a test environment.

The configuration specifications may be for a specific piece of hardware or software, or for multiple pieces of hardware or software.

Some configuration specifications may share data with other configuration specifications. For example, physical dimensions of various ATMs may be constant and the configuration specifications for each may all have the same physical dimension data. However, each ATM may have a separate operating system or other application, and the configuration specifications for each ATM may reflect the different software as well as the same physical dimensions.

In an embodiment, once the program is informed of the identity of a particular device or software, the program may search a repository, such as the Internet, for information on how to recreate that particular device or software within a virtual test environment.

The set of accessibility rules may include various rules necessary to be accessible and ADA-compliant, such as visible font size, a screen magnifier, various input options, volume control, text-to-speech options, controller response times, as well as other rules.

These rules may vary depending on specific disabilities and capabilities/purposes of the test program. For example, if the test program is meant to be run on a touch screen device, or not run on a touch screen device, some of the input rules may be different. For example, a program run on a touch screen device may have a requirement that buttons and other input fields be a certain size to be ADA-compliant and accessible. These rules may not be relevant for a non-touch screen device.

The set of accessibility rules may be in any format, including computer code. The more accessibility rules, the more testable items and the more ADA-compliant and accessible the program may be.

The instructions may create a virtual test environment according to the configuration specifications. The instructions may analyze the configuration specifications for any data necessary to create the virtual test environment.

In an embodiment, the virtual test environment may include one specific unit of hardware or software.

In an embodiment, the virtual test environment may include multiple specific hardware or software units. The program may test the test program with each specific hardware or software unit.

In an embodiment, the program may transmit a request to a system administrator or other user for additional configuration specifications. For example, if the program is testing an ATM configuration, but the configuration specifications do not include height above ground, the program may request that information.

The virtual test environment may be a virtual twin to a specific piece of hardware or software (such as, e.g., a particular smartphone model, a particular ATM model, or a particular browser). The virtual test environment may virtually provide the same display dimensions, display type, input options, etc., as well as be able to run the test program in the same manner as the specific piece of hardware or software.

Any information required to create the virtual test environment may be included within the configuration specifications.

In an embodiment, the virtual test environment may be visible to a user. For example, the user may be able to see a virtual browser window, a virtual ATM, or another virtual device displayed on a screen proximate to the user. In an embodiment, the user may have access to modify the virtual device or software.

The instructions may run the test program with the unknown match in the virtual test environment. When the virtual test environment is configured correctly, running the test program within the test environment will have the same result (s) as running the test program on an actual specific device or software. For example, every button or selectable field may appear in the same exact position, size, and color as if it were displayed on the actual device being automatically tested by the program.

The instructions may analyze the running test program against the accessibility rules to determine whether the test program meets the accessibility rules and is ADA-compliant or not. Any appropriate method or algorithm of analysis may be used, including artificial intelligence/machine learning algorithms.

For example, if one of the accessibility rules states that the color of text has be black on all backgrounds except dark backgrounds, the instructions may analyze the text colors and background colors to determine if the test program meets this accessibility rule. In another example, if an accessibility rule requires a screen magnifier and text-to-speech capability, the instructions may analyze the test program to determine if it provides a sufficient screen magnifier and text-to-speech capabilities for a particular hardware or software model.

The instructions may determine when the test program fails to meet one or more of the accessibility rules or meets any particular accessibility rule. For example, with a set of ten accessibility rules, the instructions may determine that the test program meets three of them but does not meet the other seven. Each failure or success may be reported to a user or system administrator.

When the instructions determine that the test program fails to meet two or more of the accessibility rules, the instructions may prioritize each failure in order of importance. For example, a failure to meet one rule regarding text color and size may be more important to fix than a failure to meet a different rule regarding a screen magnifier. To make this priority determination, the program may analyze the likely user, the various uses of the test program and their frequency, how hard or easy it would be to fix a failure, whether fixing a failure would bring the test program to ADA-compliance or not, and other factors. The factors and weight of factors to determine priority may be adjusted by the program automatically or may be adjusted by a system administrator.

The instructions may generate a report including the results of the analysis and determinations, as well as any other necessary information, such as a copy of the test program and information on the tested configuration (s). The instructions may transmit the report to a system administrator or other user.

In an embodiment, when the computer program product determines that the test program fails to meet one or more of the accessibility rules, the instructions may determine a potential fix for each failure, create code to implement each potential fix, implement the code into the test program to create a revised test program, and test the revised test program within the virtual test environment. The instructions may utilize one or more artificial intelligence/machine learning ("AI/ML") algorithms to: determine the potential fix, create code and implement the code. Other algorithms may also be used.

In various embodiments, this process may be iterated for a pre-determined number of test cycles/iterations, for a pre-determined amount of time, or until a potential fix is developed that meets the accessibility rule (s). Limiting the number of iterations may prevent the program from running indefinitely, as when any potential fix may fail to meet the accessibility rules.

In an embodiment, the program may automatically determine or adjust the number of test cycles/iterations or the amount of time.

When the revised test program meets the accessibility rules, the instructions may attach a copy of the revised test program to the report.

In an embodiment, the instructions may transmit a copy of the revised test program separately from the report.

In an embodiment, the instructions may push the revised test program across a network to update each copy of the test program on the network. For example, if the test program is the operating system for a model of ATM, the instructions may push the revised test program to every model of the ATM that is on a network the instructions have access to.

In an embodiment, the instructions may iterate and test additional potential fixes for a pre-determined number of test cycles/iterations, for a pre-determined amount of time, or until a potential fix is developed that meets the accessibility rule (s). Limiting the number of iterations may prevent the program from running indefinitely, as when any potential fix may fail to meet the accessibility rules.

In an embodiment, the automatic accessibility testing computer program product instructions may use one or more artificial intelligence/machine learning ("AI/ML") algorithms to perform its various functions. Any suitable AI/ML algorithm or combination of algorithms may be used.

For example, the program may use one or more AI/ML algorithms to analyze the test program, determine whether the test program meets or fails to meet any particular accessibility rule, determine a potential fix, create the code to implement the potential fix, implement the code into the test program to create the revised test program, or other functions.

In an embodiment, the configuration specifications may be for physical hardware, such as an ATM or particular smartphone model. These specifications may include the physical dimensions of the components of the physical hardware as well as any software running on the hardware, such as an operating system.

In an embodiment, the configuration specifications may be for software, such as, e.g., a web browser, bespoke screen display program, or operating system.

In an embodiment, when the test program meets all of the two or more accessibility rules, the instructions may approve the test program and report that approval to a system administrator or other user.

In an embodiment, the instructions may stamp the test program as approved. The stamp may be visible as a watermark or other display. The stamp may inform an end-user that the test program is ADA-compliant and accessible.

In an embodiment, the report may be transmitted to a system administrator or other user. The end location of the transmission may be variable.

In an embodiment, the instructions may prioritize each failure through an analysis by one or more artificial intelligence/machine learning ("AI/ML") algorithms. Any suitable AI/ML algorithm may be used. Prioritizing may determine which failure of two or more failures to meet the accessibility rules is the most important to fix first. Or, prioritizing may include a ranking of failures in the order of easiness of creating and implementing a fix. For example, a software fix may be easier than a hardware fix.

In an embodiment, the virtual test environment may be a simulated augmented reality/virtual reality environment. For example, the instructions may create a model of an ATM per the specifications. The model may be placed within an AR/VR environment. In an embodiment, the virtual test environment may include a simulated user with one or more disabilities. The instructions may simulate a user with a particular disability interacting with the model within the AR/VR environment. The program may analyze the simulation as all or part of the testing of the test program against the accessibility rules.

An apparatus for automatic accessibility testing is provided. The apparatus may include a central server and user-facing hardware.

The central server may include a server communication link, a server processor, and a server non-transitory memory. The server non-transitory memory may be configured to store, inter alia, a server operating system and an automatic accessibility testing application.

The user-facing hardware may include a user communication link, a user processor, a display, an input device, and user non-transitory memory. The user non-transitory memory may be configured to store, inter alia, a user operating system and a test program.

The automatic accessibility testing application may be configured to: receive a set of two or more accessibility rules, communicate with the test program, create a virtual test environment on the user-facing hardware, run the test program in the virtual test environment, analyze the running test program against the accessibility rules, determine when the test program fails to meet one or more of the accessibility rules, generate a report, and when the test program fails to meet two or more of the accessibility rules prioritize each failure and generate a report including the results of the analysis.

In an embodiment, the automatic accessibility testing application may be further configured to: determine a potential fix when the test program fails to meet one or more of the accessibility rules, create code to implement the potential fix, implement the code into the test program to create a revised test program, test the revised test program within the virtual test environment, and when the revised test program meets the accessibility rules, attach a copy of the revised test program to the report.

In an embodiment, the central server may also include the user-facing hardware.

In an embodiment, the user-facing hardware may be configurable by the automatic accessibility testing application. For example, the testing application may increase or decrease the brightness or contrast on the hardware display.

A method for automatic accessibility testing is provided. The method may include the step of receiving, by an automatic accessibility testing computer program at a central server, configuration specifications, a set of two or more accessibility rules, and a test program with an unknown match to the accessibility rules.

The method may include the step of creating, by the computer program, a virtual test environment on the central server according to the configuration specifications.

The method may include the step of running the test program with the unknown match in the virtual test environment.

The method may include the step of analyzing, by the computer program, the running test program against the accessibility rules.

The method may include the step of determining, by the computer program, when the test program meets or fails to meet one or more of the accessibility rules.

When the test program fails to meet two or more of the accessibility rules, the method may include the step of prioritizing, by the computer program, each failure in a hierarchal list.

The method may include the step of generating a report including the results of the analysis and determination.

In an embodiment, when the computer program determines that the test program fails to meet one or more of the accessibility rules, the method may include the steps of determining a potential fix, creating code to implement the potential fix, implementing the code into the test program to create a revised test program, testing the revised test program within the virtual test environment, and when the revised test program meets the accessibility rules, attaching a copy of the revised test program to the report.

In an embodiment, the computer program may use one or more artificial intelligence/machine learning ("AI/ML") algorithms in the steps of:

1) creating a virtual test environment on the central server according to the configuration specifications;
2) analyzing the running test program against the accessibility rules;
3) determining when the test program meets or fails to meet one or more of the accessibility rules;
4) prioritizing each failure;
5) determining a potential fix;
6) creating code to implement the potential fix;
7) implementing the code into the test program to create a revised test program;
8) testing the revised test program within the virtual test environment;
9) other steps; and
10) a combination of the above.

In an embodiment, the method may include the step of automatically updating the test program across a network with the revised test program.

In an embodiment, the reports and other information may be recorded in a distributed ledger/blockchain database. A distributed ledger may have an advantage of being immutable/unchangeable and the recorded information may not be tampered with.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
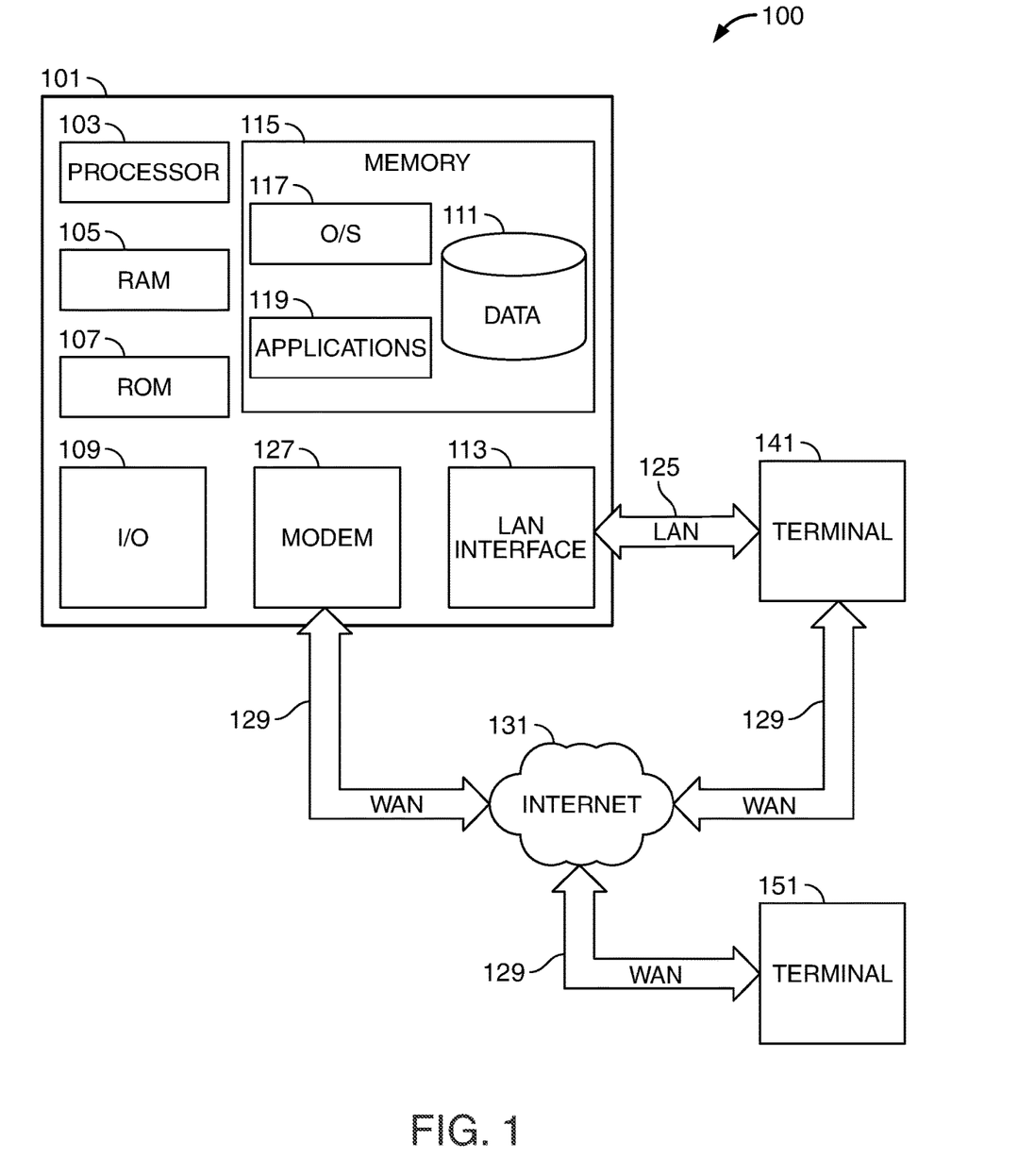
FIG. 1 shows an illustrative apparatus in accordance with principles of the disclosure.

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an automatic accessibility testing program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application (s) 119 (such as an automatic accessibility testing program and security protocols) along with any other data 111 (historical data, configuration files, accessibility rules) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application (s) (such as an automatic accessibility testing program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic accessibility testing program and security protocols, as well as other programs. In an embodiment, one or more programs, or aspects of a program, may use one or more AI/ML algorithm (s). The various tasks may be related to automatic accessibility and ADA-compliance testing.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
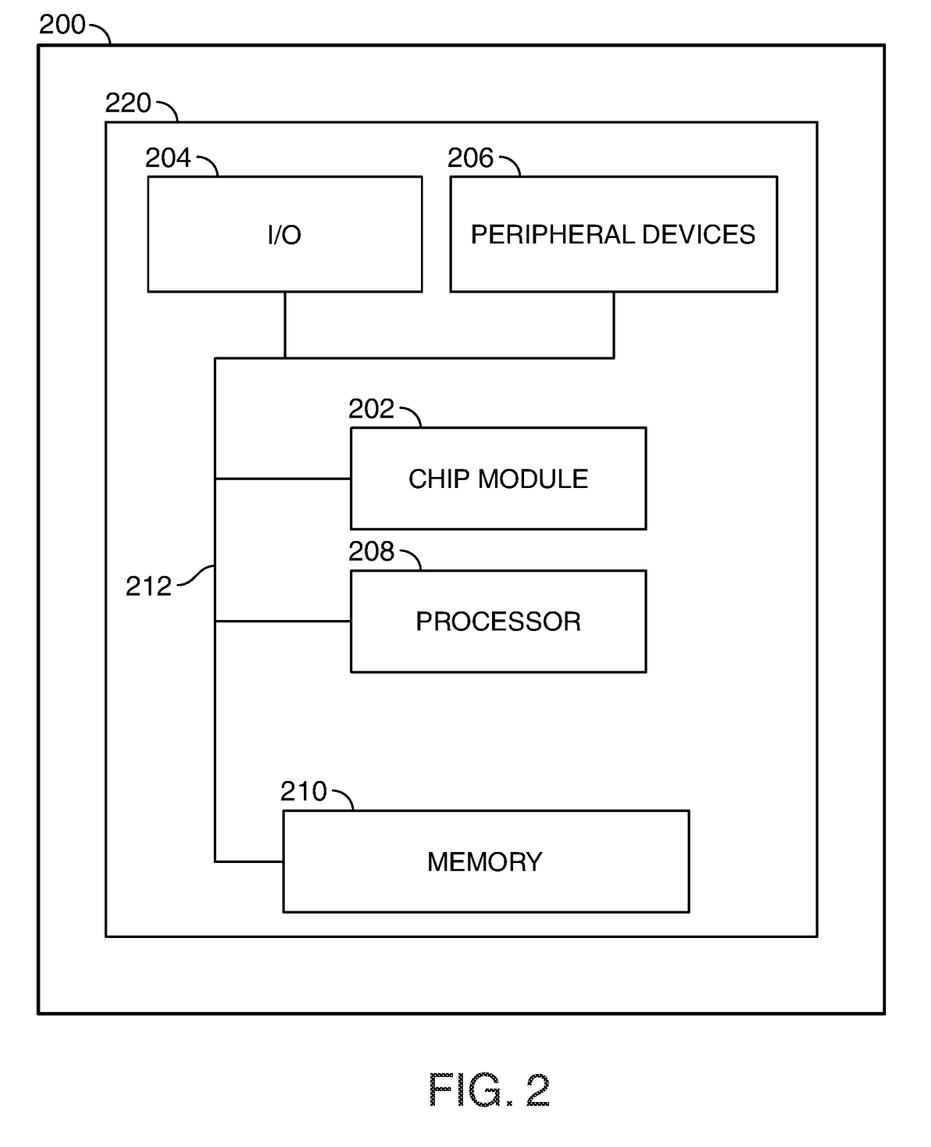
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
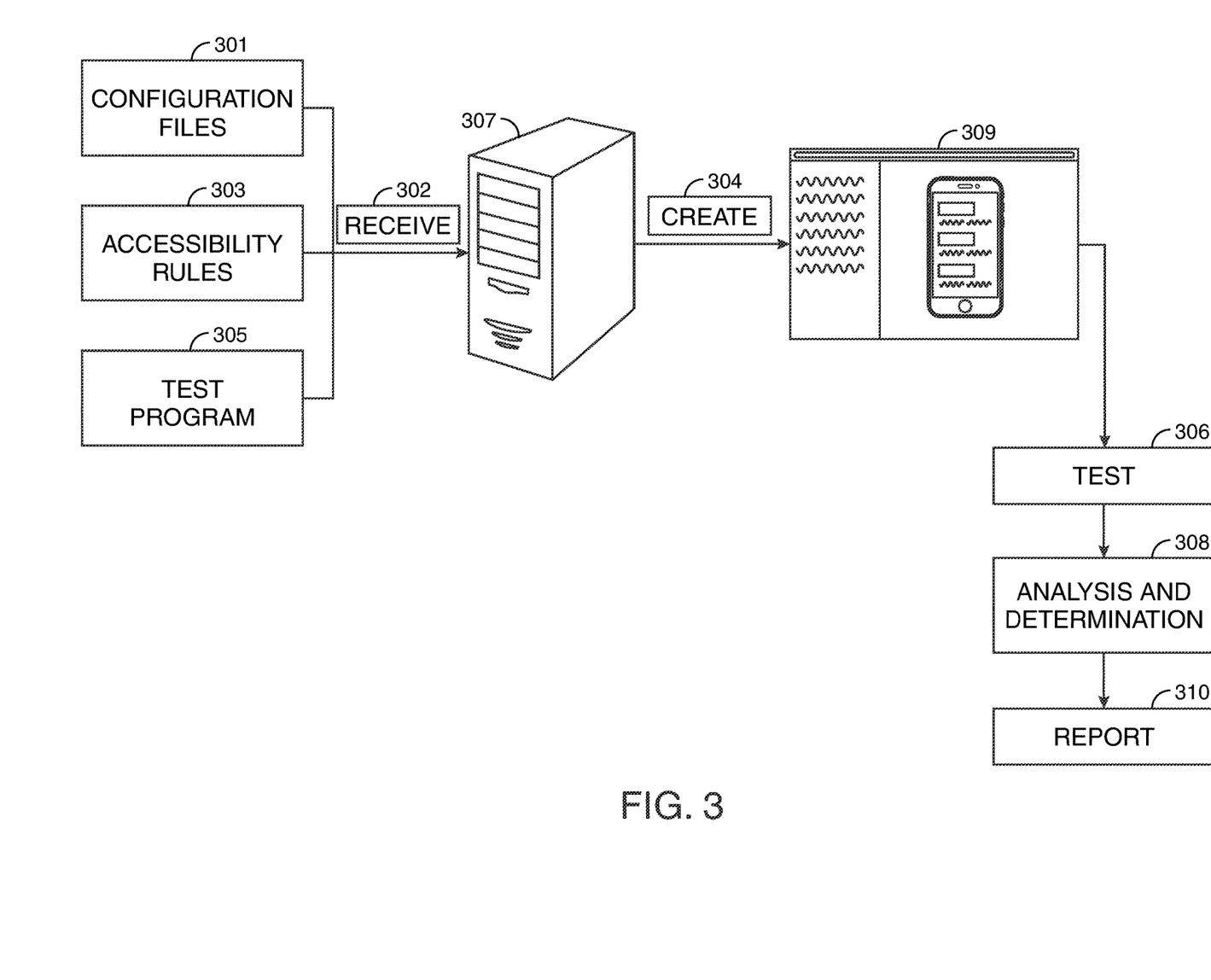
FIG. 3 shows an illustrative schematic in accordance with principles of the disclosure.

FIG. 3 shows an illustrative schematic in accordance with principles of the disclosure. Apparatus may include any of the components and systems odd-numbered 301 through 309, among other components. Methods may include some or all of the method steps even-numbered 302 through 310, as well as additional steps. Methods may include the steps illustrated in FIG. 3 in an order different from the illustrated order. The illustrative method shown in FIG. 3 may include one or more steps performed in other figures or described herein. Steps 302 through 310 may be performed on the apparatus shown in FIGS. 1-4, and 6 or other apparatus shown in other figures or described elsewhere.

The system may include configuration setting files 301, accessibility rules 303, and a test program 305. These may be received by a computer 307 at step 302. The computer 307 may include an automatic accessibility testing computer program product (not shown).

The automatic accessibility testing computer program product on computer 307 may, at step 304, create a virtual test environment 309 according to the configuration files 301.

The automatic accessibility testing computer program product may, at step 306, test the test program 305 in the virtual test environment 309. At step 308, the automatic accessibility testing computer program product may analyze and determine whether the test program 305 meets or fails to meet the accessibility rules 303.

At step 310, the automatic accessibility testing computer program product may generate and transmit a report of its findings to a system administrator or other user.

Figure 4:
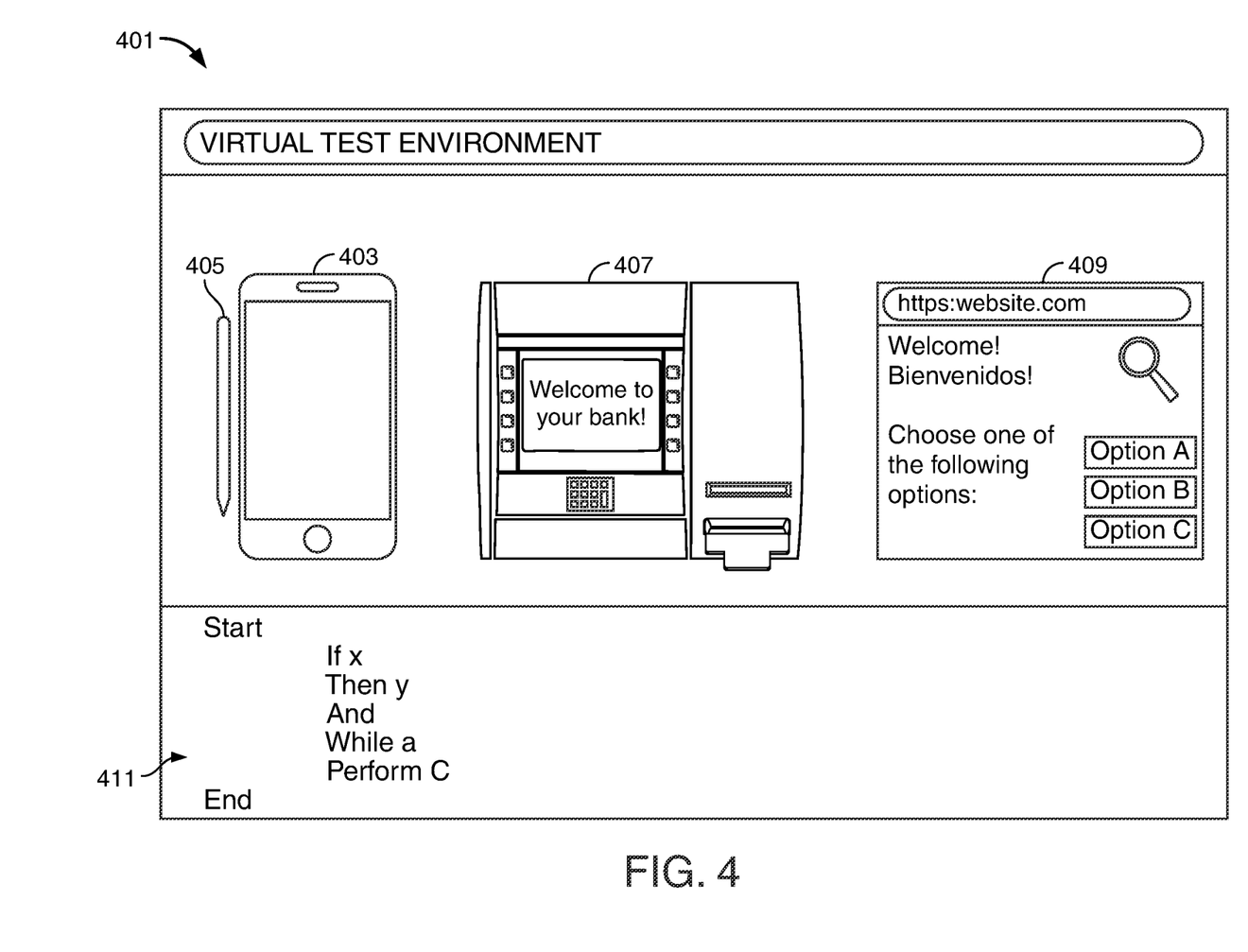
FIG. 4 shows an illustrative test environment in accordance with principles of the disclosure.

FIG. 4 shows an illustrative test environment in accordance with principles of the disclosure. Virtual test environment 401 may include multiple distinct virtual hardware or software tests, such as a virtual smartphone model 403 and stylus 405, a virtual ATM 407, as well as a virtual browser 409. Other hardware or software may be modeled within the virtual test environment 401.

The virtual test environment 401 may also include a area 411 that may include code, such as a test program (not shown).

An automatic accessibility testing computer program product may create the virtual test environment 401 to automatically test a test program against various accessibility rules to determine whether the test program meets or fails to meet the accessibility rules. As shown, the automatic accessibility testing computer program product may test the test program against one or more units of hardware or software, as the test program may behave differently on different units of hardware or software.

Figure 5:
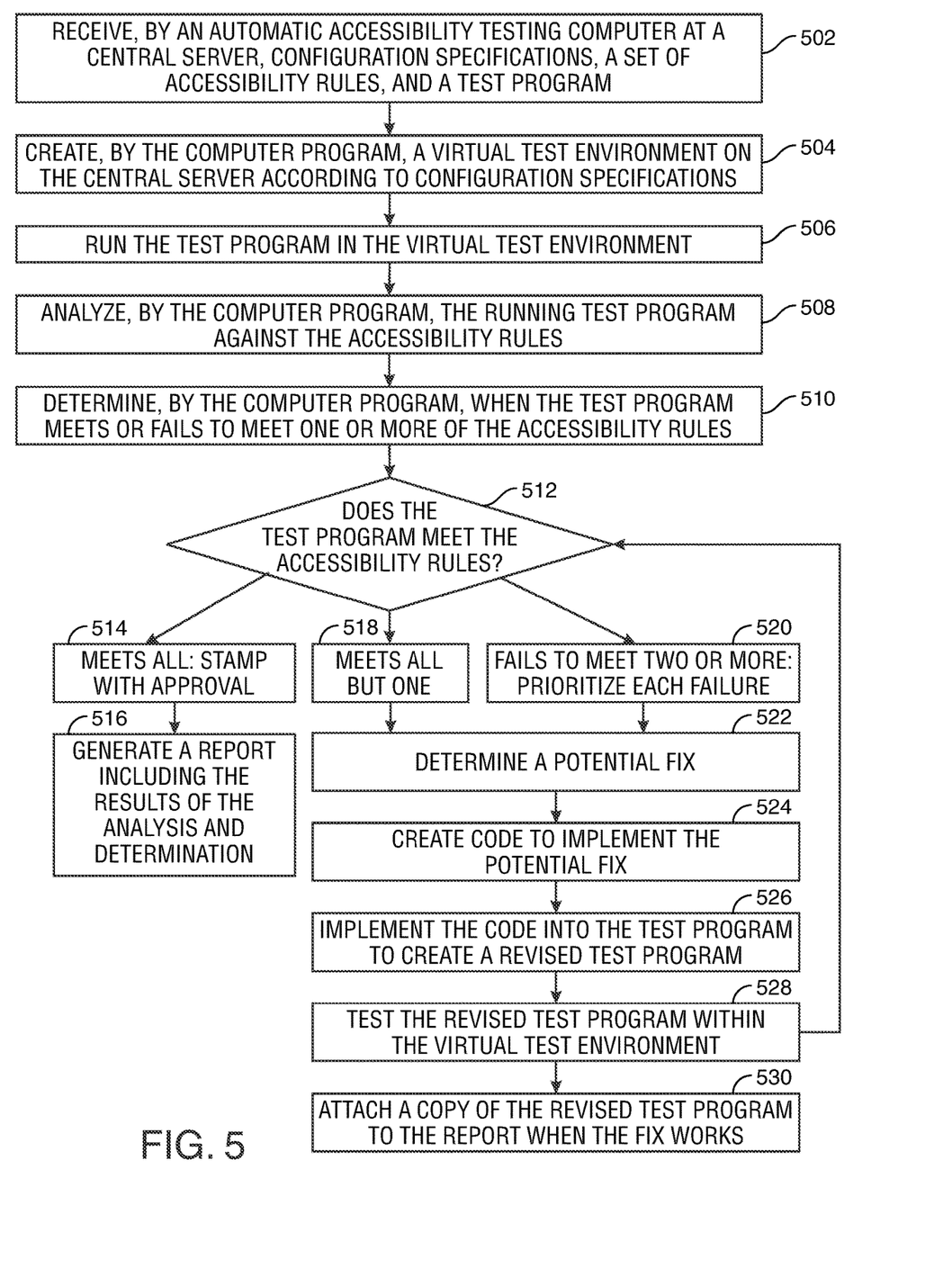
FIG. 5 shows an illustrative flowchart in accordance with principles of the disclosure.

FIG. 5 shows an illustrative flowchart in accordance with principles of the disclosure. Methods may include some or all of the method steps numbered 502 through 530. Methods may include the steps illustrated in FIG. 5 in an order different from the illustrated order. The illustrative method shown in FIG. 5 may include one or more steps performed in other figures or described herein. Steps 502 through 522 may be performed on the apparatus shown in FIGS. 1-4, 6 or other apparatus.

At step 502, an automatic accessibility testing computer program product located on a central server may receive: configuration specifications, a set of one or more accessibility rules, and a test program to test against the accessibility rules. The test program may have an unknown match with the accessibility rules. The test program may meet or fail to meet one or more of the accessibility rules.

At step 504, the program may create a virtual test environment on the central server or elsewhere. The virtual test environment may be created according to the configuration specifications received at step 502.

At step 506, the program may run the test program in the virtual test environment. Running the test program will show the program how the test program behaves on various hardware or software.

At step 508, the automatic accessibility testing computer program product may analyze the running test program against the accessibility rules.

At steps 510 and 512, the automatic accessibility testing computer program product may determine when the test program meets or fails to meet any particular accessibility rule from the set of accessibility rules received at step 502.

At step 514, the automatic accessibility testing computer program product may determine that the test program meets all of the accessibility rules. The program may stamp the test program with a stamp of approval. At step 516, the program may generate and transmit a report of its findings to a system administrator or other user.

At step 518, the program may determine that the test program meets all but one accessibility rule. At step 520, the program may determine that the test program fails to meet two or more of the accessibility rules. When the test program fails to meet two or more of the accessibility rules, the program may prioritize the failures in an order of importance as determined by the program.

At step 522, the automatic accessibility testing computer program product may determine a potential fix to a failure to meet an accessibility rule.

At step 524, the automatic accessibility testing computer program product may create code to implement the potential fix determined at step 522.

At step 526, the automatic accessibility testing computer program product may implement the code into the test program, creating a revised test program.

At step 528, the automatic accessibility testing computer program product may test the revised test program within the virtual test environment. The automatic accessibility testing computer program product may then revert back to steps 510 and 512 to analyze the revised test program.

When the revised test program meets the accessibility rule targeted by the potential fix, the automatic accessibility testing computer program product may attach a copy of the revised test program to the report. In an embodiment, the program may also transmit the revised test program separately and update each instance of the test program across a network.

Figure 6:
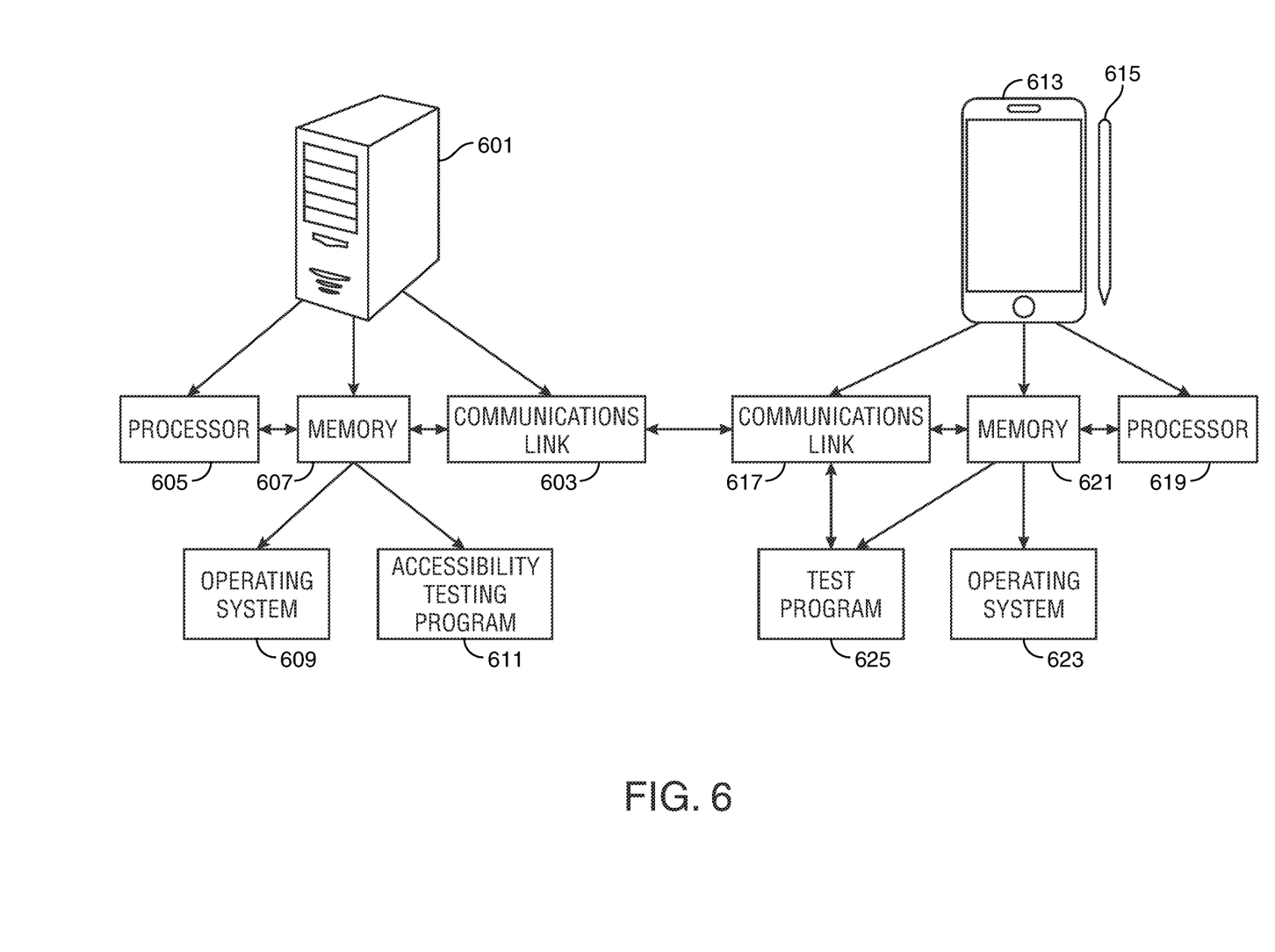
FIG. 6 shows an illustrative apparatus in accordance with principles of the disclosure.

FIG. 6 shows an illustrative apparatus in accordance with principles of the disclosure. A server/computer 601 may include a communication link 603, a processor/processors 605, and a non-transitory memory 607, as well as other components.

The non-transitory memory 607 may include an operating system 609, and an automatic accessibility testing computer program product/application 611, as well as other data and programs.

The communications link 603 may communicate with user-facing device 613 (such as a smartphone, tablet, or other mobile computing device, an ATM, a personal computer, or other computer).

The user-facing device 613 may include a display, an input device 615 (such as a stylus or touchscreen), a user communications link 617, a user processor/processors 619, and user non-transitory memory 621.

The user non-transitory memory 621 may include a user operating system 623 and a test program 625.

The automatic accessibility testing application 611 may be configured to: receive a set of two or more accessibility rules; communicate with the test program; create a virtual test environment on the user-facing hardware; run the test program in the virtual test environment; analyze the running test program against the accessibility rules; and determine when the test program fails to meet one or more of the accessibility rules.

When the test program fails to meet two or more of the accessibility rules, the application may prioritize each failure, and generate a report including the results of the analysis.

Thus, apparatus and methods for automatically testing, in real-time, a test program against accessibility rules to determine accessibility and ADA-compliance are provided. Persons skilled in the art will appreciate that the present invention can be practiced by other than the described embodiments, which are presented for purposes of illustration rather than of limitation.

What is claimed is:

1. An automatic accessibility testing computer program product, the computer program product comprising executable instructions stored on a non-transitory memory, the executable instructions when executed by a processor on a computer system:
    receive:
        configuration specifications for physical hardware;
        a set of two or more Americans with Disabilities Act compliant (ADA-compliant) accessibility rules; and
        a test program with an unknown match to the set of two or more ADA-compliant accessibility rules;
    search a repository for information to recreate the physical hardware within a virtual test environment;

create the virtual test environment according to the configuration specifications for physical hardware and the information;
run the test program with the unknown match in the virtual test environment;
analyze the running test program against the set of two or more ADA-compliant accessibility rules;
determine when the test program fails to meet one or more of the ADA-compliant accessibility rules;
when the test program fails to meet two or more of the ADA-compliant accessibility rules, prioritize each failure;
when the test program satisfies the two or more ADA-compliant accessibility rules, generate a visible stamp of approval; and
generate a report including the results of the analysis;
wherein the virtual test environment is a simulated augmented reality/virtual reality environment.

2. The automatic accessibility testing computer program product of claim 1 wherein when the computer program product determines that the test program fails to meet one or more of the ADA-compliant accessibility rules, the instructions:
determine a potential fix;
create code to implement the potential fix;
implement the code into the test program to create a revised test program;
test the revised test program within the virtual test environment; and
when the revised test program meets the one or more of the ADA-compliant accessibility rules, attach a copy of the revised test program to the report.

3. The automatic accessibility testing computer program product of claim 2 wherein when the revised test program fails to meet the one or more of the ADA-compliant accessibility rules, the instructions iterate and test additional potential fixes for a pre-determined amount of time.

4. The automatic accessibility testing computer program product of claim 2 wherein the instructions use one or more artificial intelligence/machine learning ("AI/ML") algorithms to:
determine the potential fix;
create the code to implement the potential fix;
implement the code into the test program to create the revised test program.

5. The automatic accessibility testing computer program product of claim 1 wherein the configuration specifications are also for software.

6. The automatic accessibility testing computer program product of claim 1 wherein the configuration specifications are for a web browser.

7. The automatic accessibility testing computer program product of claim 1 wherein when the test program meets all of the two or more ADA-compliant accessibility rules, the instructions approve the test program.

8. The automatic accessibility testing computer program product of claim 1 wherein the report is transmitted to a system administrator.

9. The automatic accessibility testing computer program product of claim 1 wherein the instructions prioritize each failure through an analysis by one or more artificial intelligence/machine learning ("AI/ML") algorithms.

10. The automatic accessibility testing computer program product of claim 1 wherein the virtual test environment includes a simulated user.

11. An apparatus for automatic accessibility testing, the apparatus comprising:
a central server, the central server including:
a server communication link;
a server processor;
a server non-transitory memory configured to store at least:
a server operating system; and
an automatic accessibility testing application; and
user-facing hardware, the user-facing hardware including:
a user communication link;
a user processor;
a display;
an input device; and
user non-transitory memory configured to store at least:
a user operating system; and
a test program;
wherein the automatic accessibility testing application is configured to:
receive a set of two or more Americans with Disabilities Act compliant (ADA-compliant) accessibility rules;
communicate with the test program;
search a repository for information to recreate the user-facing hardware within a virtual test environment;
create the virtual test environment on the user-facing hardware;
run the test program in the virtual test environment;
analyze the running test program against the set of two or more ADA-compliant accessibility rules;
determine when the test program fails to meet one or more of the ADA-compliant accessibility rules;
when the test program fails to meet two or more of the ADA-compliant accessibility rules:
prioritize each failure; and
generate a report including the results of the analysis; and
when the test program meets the two or more ADA-compliant accessibility rules, generate a visible stamp of approval;
wherein the virtual test environment is a simulated augmented reality/virtual reality environment.

12. The apparatus of claim 11 wherein the automatic accessibility testing application is further configured to:
determine a potential fix when the test program fails to meet one or more of the ADA-compliant accessibility rules;
create code to implement the potential fix;
implement the code into the test program to create a revised test program;
test the revised test program within the virtual test environment; and
when the revised test program meets the one or more ADA-compliant accessibility rules, attach a copy of the revised test program to the report.

13. The apparatus of claim 11 wherein the central server includes the user-facing hardware.

14. The apparatus of claim 11 wherein the user-facing hardware is configurable by the automatic accessibility testing application.

15. A computer-implemented method for automatic accessibility testing, the method comprising the steps of:
receiving, by an automatic accessibility testing computer program at a central server:
configuration specifications for physical hardware;

a set of two or more Americans with Disabilities Act compliant (ADA-compliant) accessibility rules; and
a test program with an unknown match to the set of two or more ADA-compliant accessibility rules;
searching a repository for information to recreate the physical hardware within a virtual test environment;
creating, by the computer program, the virtual test environment on the central server according to the configuration specifications and the information;
running the test program with the unknown match in the virtual test environment;
analyzing, by the computer program, the running test program against the set of two or more ADA-compliant accessibility rules;
determining, by the computer program, when the test program meets or fails to meet one or more of the ADA-compliant accessibility rules;
when the test program fails to meet two or more of the ADA-compliant accessibility rules, prioritizing, by the computer program, each failure;
when the test program meets the two or more ADA-compliant accessibility rules, generating a visible stamp of approval; and
generating a report including the results of the analysis and determination;
wherein the virtual test environment is a simulated augmented reality/virtual reality environment.

16. The computer-implemented method of claim 15 further comprising the steps of:
when the computer program determines that the test program fails to meet one or more of the ADA-compliant accessibility rules:
determining a potential fix;
creating code to implement the potential fix;
implementing the code into the test program to create a revised test program;
testing the revised test program within the virtual test environment; and
when the revised test program meets the one or more ADA-compliant accessibility rules, attaching a copy of the revised test program to the report.

17. The computer-implemented method of claim 16 wherein the computer program uses one or more artificial intelligence/machine learning ("AI/ML") algorithms in the steps of:
creating a virtual test environment on the central server according to the configuration specifications;
analyzing the running test program against the set of two or more ADA-compliant accessibility rules;
determining when the test program meets or fails to meet one or more of the ADA-compliant accessibility rules;
prioritizing each failure;
determining a potential fix;
creating code to implement the potential fix;
implementing the code into the test program to create a revised test program; and
testing the revised test program within the virtual test environment.

18. The computer-implemented method of claim 16 further comprising the step of automatically updating the test program across a network with the revised test program.

* * * * *